United States Patent [19]

Johnson

[11] 4,151,431
[45] Apr. 24, 1979

[54] PERMANENT MAGNET MOTOR

[76] Inventor: Howard R. Johnson, 3300 Mt. Hope Rd., Grass Lake, Mich. 49240

[21] Appl. No.: 422,306

[22] Filed: Dec. 6, 1973

[51] Int. Cl.² .................... H02K 41/00; H02N 11/00
[52] U.S. Cl. ..................................... 310/12; 310/152
[58] Field of Search ............ 24/DIG. 9; 415/DIG. 2; 46/236; 273/118 A, 119 A, 120 A, 121 A, 122 A, 123 A, 124, 125 A, 126 A, 130 A, 131 A, 131 AD, 134 A, 135 A, 136 B, 137 AE, 138 A

[56] References Cited

U.S. PATENT DOCUMENTS 4,074,153   2/1978   Baker et al. ............................ 310/12

Primary Examiner—Donovan F. Duggan
Attorney, Agent, or Firm—Beaman & Beaman

[57] ABSTRACT

The invention is directed to the method of utilizing the unpaired electron spins in ferro magnetic and other materials as a source of magnetic fields for producing power without any electron flow as occurs in normal conductors, and to permanent magnet motors for utilizing this method to produce a power source. In the practice of the invention the unpaired electron spins occurring within permanent magnets are utilized to produce a motive power source solely through the superconducting characteristics of a permanent magnet and the magnetic flux created by the magnets are controlled and concentrated to orient the magnetic forces generated in such a manner to do useful continuous work, such as the displacement of a rotor with respect to a stator. The timing and orientation of magnetic forces at the rotor and stator components produced by permanent magnets to produce a motor is accomplished with the proper geometrical relationship of these components.

28 Claims, 10 Drawing Figures

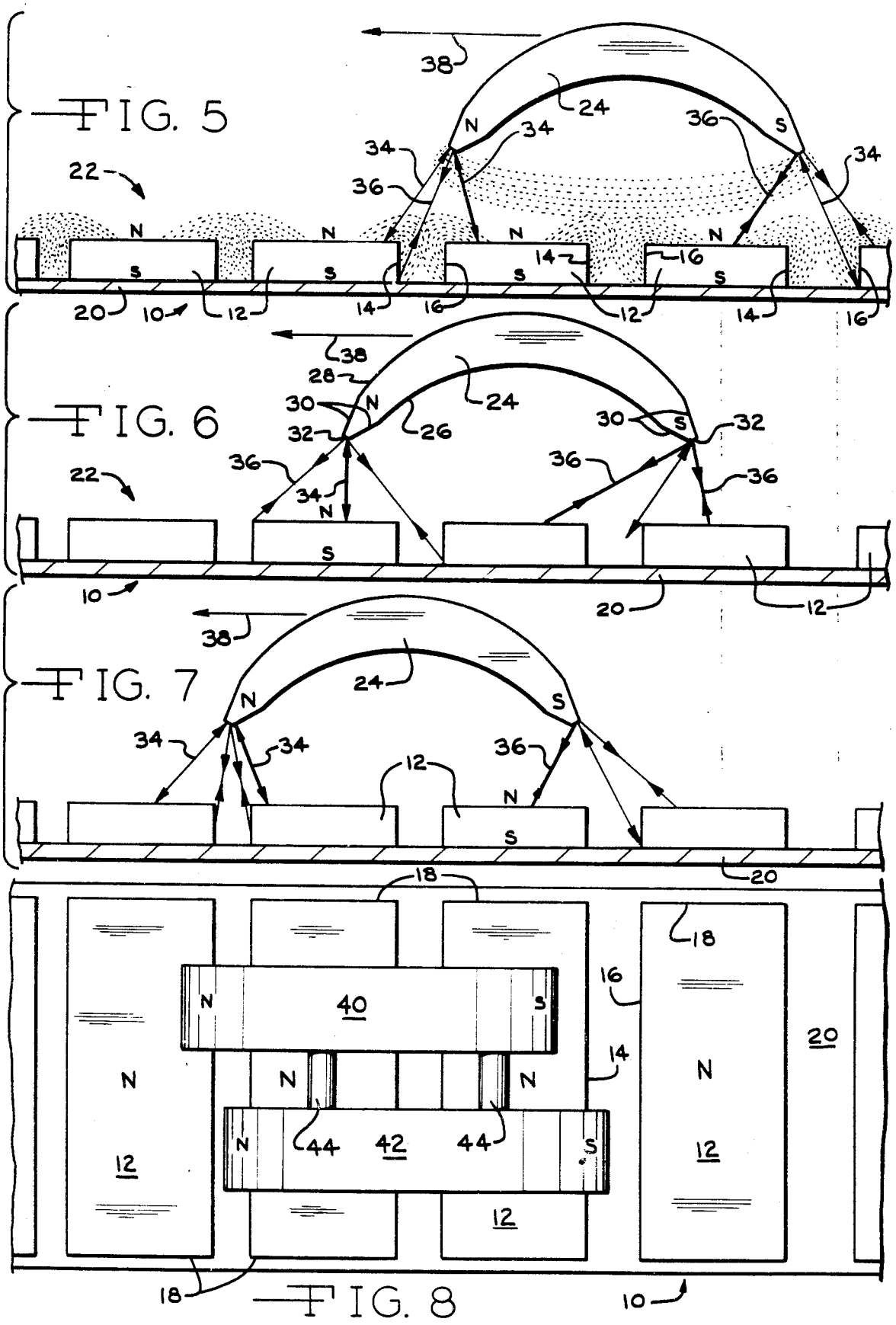

PERMANENT MAGNET MOTOR

FIELD OF THE INVENTION

The invention pertains to the field of permanent magnet motor devices solely using the magnetic fields created thereby to product motive power.

BACKGROUND OF THE INVENTION

Conventional electric motors employ magnetic forces to produce either rotative or linear motion. Electric motors operate on the principle that when a conductor is located in a magnetic field which carries current a magnetic force is exerted upon it.

Normally, in a conventional electric motor, the rotor, or stator, or both, are so wired that magnetic fields created by electromagnetics may employ attraction, repulsion, or both types of magnetic forces, to impose a force upon the armature to cause rotation, or to cause the armature to be displaced in a linear path. Conventional electric motors may employ permanent magnets either in the armature or stator components, but in the art heretofore known the use of permanent magnets in either the stator or armature require the creation of an electromagnetic field to act upon the field produced by the permanent magnets, and switching means are employed to control the energization of the electromagnets and the orientation of the magnetic fields, to produce the motive power.

It is my belief that the full potential of magnetic forces existing in permanent magnets has not been recognized or utilized because of incomplete information and theory with respect to the atomic motion occurring within a permanent magnet. It is my belief that a presently unnamed atomic particle is associated with the electron movement of a superconducting electromagnet and the lossless current flow of Amperian currents in permanent magnets. The unpaired electron flow is similar in both situations. This small particle is believed to be opposite in charge and to be located at right angles to the moving electron, and the particle would be very small as to penetrate all known elements, in their various states as well as their known compounds, unless they have unpaired electrons which capture these particles as they endeavor to pass therethrough.

Ferro electrons differ from those of most elements in that they are unpaired, and being unpaired they spin around the nucleus in such a way that they respond to magnetic fields as well as creating one themselves. If they were paired, their magnetic fields would cancel out. However, being unpaired they create a measurable magnetic field if their spins have been oriented in one direction. The spins are at right angles to their magnetic fields.

In niobium superconductors at a critical state, the magnetic lines of force cease to be at right angles. This change must be due to establishing the required conditions for unpaired electronic spins instead of electron flow in the conductor, and the fact that very powerful electromagnets that can be formed with superconductors illustrates the tremendous advantage of producing the magnetic field by unpaired electron spins rather than conventional electron flow.

In a superconducting metal, wherein the electrical resistance becomes greater in the metal than the proton resistance, the flow turns to electron spins and the positive particles flow parallel in the metal in the manner occurring in a permanent magnet where a powerful flow of magnetic positive particles or magnetic flux causes the unpaired electrons to spin at right angles. Under cryogenic superconduction conditions the freezing of the crystals in place makes it possible for the spins to continue, and in a permanent magnet the grain orientation of the magnetized material results in the spins permitting them to continue and for the flux to flow parallel to the metal.

In a superconductor, at first the electron is flowing and the positive particle is spinning; later, when critical, the reverse occurs, i.e., the electron is spinning and the positive particle is flowing at right angles. These positive particles will thread or work their way through the electron spins present in the metal.

In a sense, a permanent magnet may be considered the only room temperature superconductor. It is a superconductor because the electron flow does not cease, and this electron flow can be made to do work because of the magnetic field it supplies. Previously, this source of power has not been used because it was not possible to modify the electron flow to accomplish the switching functions of the magnetic field. Such switching functions are common in a conventional electric motor where electrical current is employed to align the much greater electron current in the iron pole pieces and concentrate the magnetic field at the proper places to give the thrust necessary to move the motor armature. In a conventional electric motor, switching is accomplished by the use of brushes, commutators, alternating current, or other known means.

In order to accomplish the switching function in a permanent magnet motor, it is necessary to shield the magnetic leakage so that it will not appear as too great a loss factor at the wrong places. The best method to accomplish this is to use the superconductor of magnetic flux and concentrate it to the place where it will be the most effective. Timing and switching can be achieved in a permanent magnet motor by concentrating the flux and using the proper geometry of the motor rotor and stator to make most effective use of the magnetic fields generated by the electron spins. By the proper combination of materials, geometry and magnetic concentration, it is possible to achieve a mechanical advantage of high ratio, greater than 100 to 1, capable of producing a continuous motive force.

To my knowledge, previous work done with permanent magnets, and motive devices utilizing permanent magnets, have not achieved the result desired in the practice of the inventive concept, and it is with the proper combination of materials, geometry and magnetic concentration that the presence of the magnetic spins within a permanent magnet may be utilized as a motive force.

SUMMARY OF THE INVENTION

It is an object of the invention to utilize the magnetic spinning phenomenon of unpaired electrons occurring in ferro magnetic material to produce the movement of a mass in a unidirectional manner as to permit a motor to be driven solely by magnetic forces as occurring within permanent magnets. In the practice of the inventive concepts, motors of either linear or rotative types may be produced.

It is an object of the invention to provide the proper combination of materials, geometry and magnetic concentration to utilize the force generated by unpaired electron spins existing in permanent magnets to power a motor. Whether the motor constitutes a linear embodiment, or a rotary embodiment, in each instance the "stator" may consist of a plurality of permanent magnets fixed relative to each other in space relationship to define a track, linear in form in the linear embodiment, and circular in form in the rotary embodiment. An armature magnet is located in spaced relationship to such track defined by the stator magnets wherein an air gap exists therebetween. The length of the armature magnet is defined by poles of opposite polarity, and the length of the armature magnet is disposed relative to the track defined by the stator magnets in the direction of the path of movement of the armature magnet as displaced by the magnetic forces.

The stator magnets are so mounted that poles of like polarity are disposed toward the armature magnet and as the armature magnet has poles which are both attracted to and repelled by the adjacent pole of the stator magnets, both attraction and repulsion forces act upon the armature magnet to produce the relative displacement between the armature and stator magnets.

The continuing motive force producing displacement between the armature and stator magnets results from the relationship of the length of the armature magnet in the direction of its path of movement as related to the dimension of the stator magnets, and the spacing therebetween, in the direction of the path of armature magnet movement. This ratio of magnet and magnet spacings, and with an acceptable air gap spacing between the stator and armature magnets, will produce a resultant force upon the armature magnet which displaces the armature magnet across the stator magnet along its path of movement.

In the practice of the invention movement of the armature magnet relative to the stator magnets results from a combination of attraction and repulsion forces existing between the stator and armature magnets. By concentrating the magnetic fields of the stator and armature magnets the motive force imposed upon the armature magnet is intensified, and in the disclosed embodiments such magnetic field concentration means are disclosed.

The disclosed magnetic field concentrating means comprise a plate of high magnetic field permeability disposed adjacent one side of the stator magnets in substantial engagement therewith. This high permeability material is thus disposed adjacent poles of like polarity of the stator magnets. The magnetic field of the armature magnet may be concentrated and directionally oriented by bowing the armature magnet, and the magnetic field may further be concentrated by shaping the pole ends of the armature magnet to concentrate the magnet field at a relatively limited surface at the armature magnet pole ends.

Preferably, a plurality of armature magnets are used which are staggered with respect to each other in the direction of armature magnet movement. Such an offsetting or staggering of the armature magnets distributes the impulses of force imposed upon the armature magnets and results in a smoother application of forces to the armature magnet producing a smoother and more uniform movement of the armature component.

In the rotary embodiment of the permanent magnet motor of the invention the stator magnets are arranged in a circle, and the armature magnets rotate about the stator magnets. Means are disclosed for producing relative axial displacement between the stator and armature magnets to adjust the axial alignment thereof, and thereby regulate the magnitude of the magnetic forces being imposed upon the armature magnets. In this manner the speed of rotation of the rotary embodiment may be regulated.

BRIEF DESCRIPTION OF THE DRAWINGS

The aforementioned objects and advantages of the invention will be appreciated from the following description and accompanying drawings wherein:

FIG. 5 is an elevational representation of a linear motor embodiment of the permanent magnet motor of the invention illustrating one position of the armature magnet relative to the stator magnets, and indicating the magnetic forces imposed upon the armature magnet, FIG. 6 is a view similar to FIG. 5 illustrating displacement of the armature magnet relative to the stator magnets, and the influence of magnetic forces thereon at this location, FIG. 7 is a further elevational view similar to FIGS. 5 and 6 illustrating further displacement of the armature magnet to the left, and the influence of the magnetic forces thereon, FIG. 8 is a top plan view of a linear embodiment of the inventive concept illustrating a pair of armature magnets in linked relationship disposed above the stator magnets.

DESCRIPTION OF THE PREFERRED EMBODIMENTS

Figure 1:
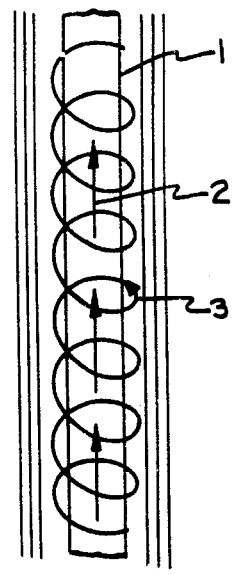
FIG. 1 is a schematic view of electron flow in a superconductor indicating the unpaired electron spins.

In order to better understand the theory of the inventive concept, reference is made to FIGS. 1 through 4. In FIG. 1 a superconductor 1 is illustrated having a positive particle flow as represented by arrow 2, the unpaired electrons of the ferrous conducting material 1 spin at right angles to the proton flow in the conductor as represented by the spiral line and arrow 3. In accord with the theory of the invention the spinning of the ferrous unpaired electrons results from the atomic structure of ferrous materials and this spinning atomic particle is believed to be opposite in charge and located at right angles to the moving electrons. It is assumed to be very small in size capable of penetrating other elements and their compounds unless they have unpaired electrons which capture these particles as they endeavor to pass therethrough.

Figure 2:
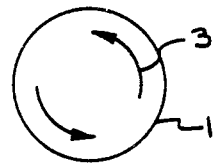
FIG. 2 is a cross-sectional view of a superconductor under a critical state illustrating the electron spins.
Figure 4:
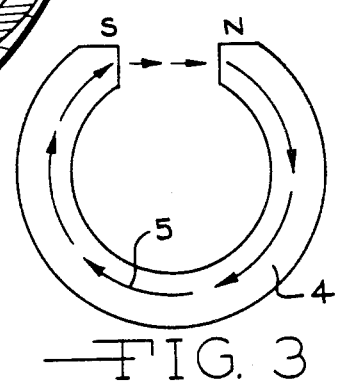
FIG. 4 is a cross-sectional view illustrating the diameter of the magnet of FIG. 3.

The lack of electrical resistance of conductors at a critical superconductor state has long been recognized, and superconductors have been utilized to produce very high magnetic flux density electromagnets. FIG. 2 represents a cross section of a critical superconductor and the electron spins are indicated by the arrows 3.

Figure 3:
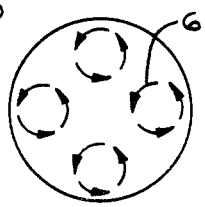
FIG. 3 is a view of a permanent magnet illustrating the flux movement therethrough.

A permanent magnet may be considered a superconductor as the electron flow therein does not cease, and is without resistance, and unpaired electric spinning particles exist which, in the practice of the invention, are utilized to produce motor force. FIG. 3 illustrates a horseshoe shaped permanent magnet at 4 and the magnetic flux therethrough is indicated by arrows 5, the magnetic flow being from the south pole to the north pole and through the magnetic material. The accumulated electron spins occurring about the diameter of the magnet 5 are represented at 6 in FIG. 4, and the spinning electron particles spin at right angles in the iron as the flux travels through the magnet material.

By utilizing the electron spinning theory of ferrous material electrons, it is possible with the proper ferromagnetic materials, geometry and magnetic concentration to utilize the spinning electrons to produce a motive force in a continuous direction, thereby resulting in a motor capable of doing work.

It is appreciated that the embodiments of motors utilizing the concepts of the invention may take many forms, and in the illustrated forms the basic relationships of components are illustrated in order to disclose the inventive concepts and principles.

The relationships of the plurality of magnets defining the stator 10 are best appreciated from FIGS. 5 through 8. The stator magnets 12 are preferably of a rectangular configuration, FIG. 8, and so magnetized that the poles exist at the large surfaces of the magnets, as will be appreciated from the N (North) and S (South) designations. The stator magnets include side edges 14 and 16 and end edges 18. The stator magnets are mounted upon a supporting plate 20, which is preferably of a metal material having a high permeability to magnetic fields and magnetic flux such as that available under the trademark Netic CoNetic sold by the Perfection Mica Company of Chicago, Illinois. Thus, the plate 20 will be disposed toward the south pole of the stator magnets 12, and preferably in direct engagement therewith, although a bonding material may be interposed between the magnets and the plate in order to accurately locate and fix the magnets on the plate, and position the stator magnets with respect to each other.

Preferably, the spacing between the stator magnets 12 slightly differs between adjacent stator magnets as such a variation in spacing varies the forces being imposed upon the armature magnet at its ends, at any given time, and thus results in a smoother movement of the armature magnet relative to the stator magnets. Thus, the stator magnets so positioned relative to each other define a track 22 having a longitudinal direction left to right as viewed in FIGS. 5 through 8.

In FIGS. 5 through 7 only a single armature magnet 24 is disclosed, while in FIG. 8 a pair of armature magnets are shown. For purposes of understanding the concepts of the invention the description herein will be limited to the use of single armature magnet as shown in FIGS. 5 through 7.

The armature magnet is of an elongated configuration wherein the length extends from left to right, FIG. 5, and may be of a rectangular transverse cross-sectional shape. For magnetic field concentrating and orientation purposes the magnet 24 is formed in an arcuate bowed configuration as defined by concave surfaces 26 and convex surfaces 28, and the poles are defined at the ends of the magnet as will be appreciated from FIG. 5. For further magnetic field concentrating purposes the ends of the armature magnet are shaped by beveled surfaces 30 to minimize the cross-sectional area at the magnet ends at 32, and the magnetic flux existing between the poles of the armature magnet are as indicated by the light dotted lines. In like manner the magnetic fields of the stator magnets 12 are indicated by the light dotted lines.

The armature magnet 24 is maintained in a spaced relationship above the stator track 22. This spacing may be accomplished by mounting the armature magnet upon a slide, guide or track located above the stator magnets, or the armature magnet could be mounted upon a wheeled vehicle carriage or slide supported upon a nonmagnetic surface or guideway disposed between the stator magnets and the armature magnet. To clarify the illustration, the means for supporting the armature magnet 24 is not illustrated and such means form no part of invention, and it is to be understood that the means supporting the armature magnet prevents the armature magnet from moving away from the stator magnets, or moving closer thereto, but permits free movement of the armature magnet to the left or right in a direction parallel to the track 22 defined by the stator magnets.

It will be noted that the length of the armature magnet 24 is slightly greater than the width of two of the stator magnets 12 and the spacing therebetween. The magnetic forces acting upon the armature magnet when in the position of FIG. 5 will be repulsion forces 34 due to the proximity of like polarity forces and attraction forces at 36 because of the opposite polarity of the south pole of the armature magnet, and the north pole field of the sector magnets. The relative strength of this force is represented by the thickness of the force line.

The resultant of the force vectors imposed upon the armature magnet as shown in FIG. 5 produce a primary force vector 38 toward the left, FIG. 5, displacing the armature magnet 24 toward the left. In FIG. 6 the magnetic forces acting upon the armature magnet are represented by the same reference numerals as in FIG. 5. While the forces 34 constitute repulsion forces tending to move the north pole of the armature magnet away from the stator magnets, the attraction forces imposed upon the south pole of the armature magnet and some of the repulsion forces, tend to move the armature magnet further to the left, and as the resultant force 38 continues to be toward the left the armature magnet continues to be forced to the left.

FIG. 7 represents further displacement of the armature magnet 24 to the left with respect to the position of FIG. 6, and the magnetic forces acting thereon are represented by the same reference numerals as in FIGS. 5 and 6, and the stator magnet will continue to move to the left, and such movement continues the length of the track 22 defined by the stator magnets 12.

Upon the armature magnet being reversed such that the north pole is positioned at the right as viewed in FIG. 5, and the south pole is positioned at the left, the direction of movement of the armature magnet relative to the stator magnets is toward the right, and the theory of movement is identical to that described above.

In FIG. 8 a plurality of armature magnets 40 and 42 are illustrated which are connected by links 44. The armature magnets are of a shape and configuration identical to that of the embodiment of FIG. 5, but the magnets are staggered with respect to each other in the direction of magnet movement, i.e., the direction of the track 22 defined by the stator magnets 12. By so staggering a plurality of armature magnets a smoother movement of the interconnected armature magnets is produced as compared when using a single armature magnet as there is variation in the forces acting upon each armature magnet as it moves above the track 22 due to the change in magnetic forces imposed thereon. The use of several armature magnets tends to "smooth out" the application of forces imposed upon linked armature magnets, resulting in a smoother movement of the armature magnet assembly. Of course, any number of armature magnets may be interconnected, limited only by the width of the stator magnet track 22.

Figure 9:
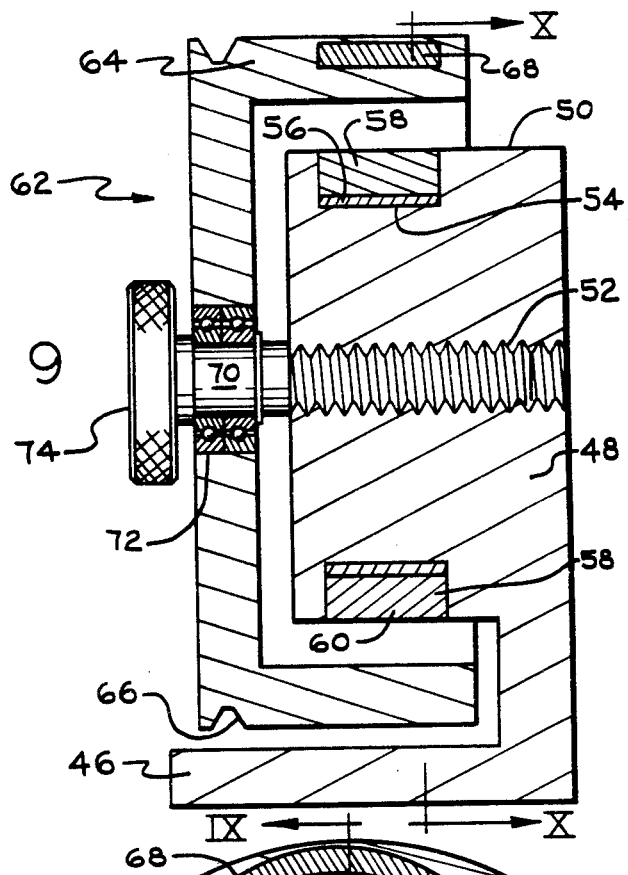
FIG. 9 is a diametrical, elevational, sectional view of a rotary motor embodiment in accord with the invention as taken along section IX—IX of FIG. 10.
Figure 10:
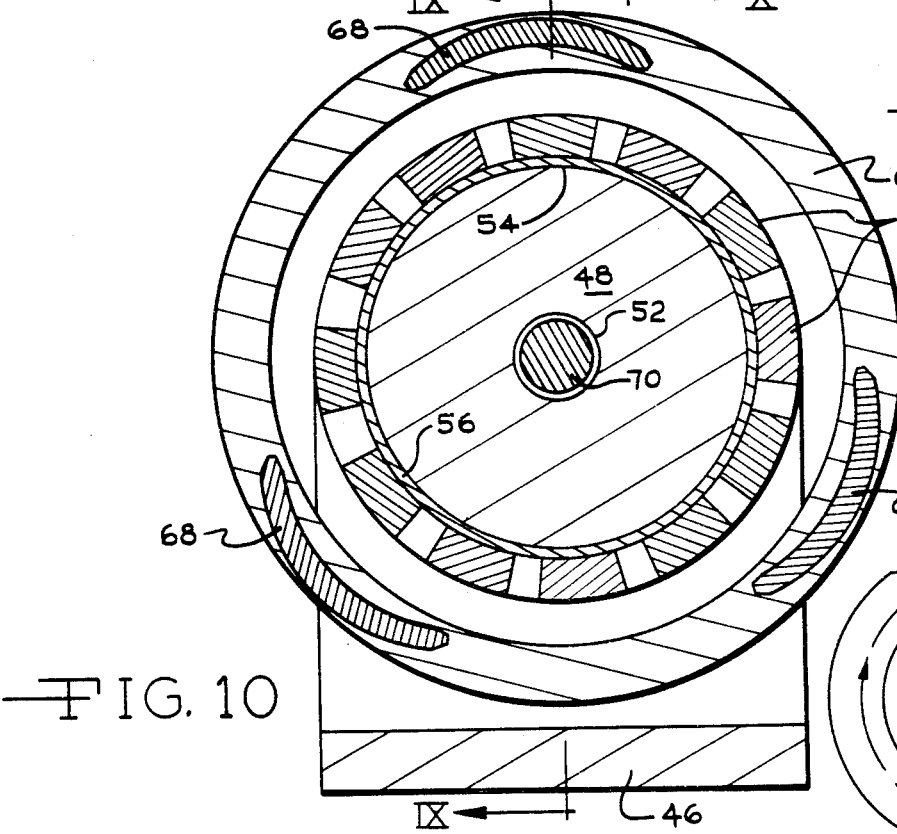
FIG. 10 is an elevational view of the rotary motor embodiment as taken along section X—X of FIG. 9.

In FIGS. 9 and 10 a rotary embodiment embracing the inventive concepts is illustrated. In this embodiment the principle of operation is identical to that described above, but the orientation of the stator and armature magnets is such that rotation of the armature magnets is produced about an axis, rather than a linear movement being achieved.

In FIGS. 9 and 10 a base is represented at 46 serving as a support for a stator member 48. The stator member 48 is made of a nonmagnetic material, such as synthetic plastic, aluminum, or the like. The stator includes a cylindrical surface 50 having an axis, and a threaded bore 52 is concentrically defined in the stator. The stator includes an annular groove 54 receiving an annular sleeve 56 of high magnetic field permeability material such as Netic Co-Netic and a plurality of stator magnets 58 are affixed upon the sleeve 56 in spaced circumferential relationship as will be apparent in FIG. 10. Preferably, the stator magnets 58 are formed with converging radial sides as to be of a wedge configuration having a curved inner surface engaging sleeve 56, and a convex outer pole surface 60.

The armature 62, in the illustrated embodiment, is of a dished configuration having a radial web portion, and an axially extending portion 64. The armature 62 is formed of a nonmagnetic material, and an annular belt receiving groove 66 is defined therein for receiving a belt for transmitting power from the armature to a generator, or other power consuming device. Three armature magnets 68 are mounted on the armature portion 64, and such magnets are of a configuration similar to the armature magnet configuration of FIGS. 5 through 7. The magnets 68 are staggered with respect to each other in a circumferential direction wherein the magnets are not disposed as 120° circumferential relationships to each other. Rather, a slight angular staggering of the armature magnets is desirable to "smooth out" the magnetic forces being imposed upon the armature as a result of the magnetic forces being simultaneously imposed upon each of the armature magnets. The staggering of the armature magnets 68 in a circumferential direction produces the same effect as the staggering of the armature magnets 40 and 42 as shown in FIG. 8.

The armature 62 is mounted upon a threaded shaft 70 by antifriction bearings 72, and the shaft 70 is threaded into the stator threaded bore 52, and may be rotated by the knob 74. In this manner rotation of the knob 74, and shaft 70, axially displaces the armature 62 with respect to the stator magnets 58, and such axial displacement will very the magnitude of the magnetic forces imposed upon the armature magnets 68 by the stator magnets thereby controlling the speed of rotation of the armature.

As will be noted from FIGS. 4–7 and 9 and 10, an air gap exists between the armature magnet or magnets and the stator magnets and the dimension of this spacing, effects the magnitude of the forces imposed upon the armature magnet or magnets. If the distance between the armature magents, and the stator magnets is reduced the forces imposed upon the armature magnets by the stator magnets are increased, and the resultant force vector tending to displace the armature magnets in their path of movement increases. However, the decreasing of the spacing between the armature and stator magnets creates a "pulsation" in the movement of the armature magnets which is objectionable, but can be, to some extent, minimized by using a plurality of armature magnets. The increasing of the distance between the armature and stator magnets reduces the pulsation tendency of the armature magnet, but also reduces the magnitude of the magnetic forces imposed upon the armature magnets. Thus, the most effective spacing between the armature magnets. Thus, the most effective spacing between the armature and stator magnets is that spacing which produces the maximum force vector in the direction of armature magnet movement, with a minimum creation of objectionable pulsation.

In the disclosed embodiments the high permeability plate 20 and sleeve 56 are disclosed for concentrating the magnetic field of the stator magnets, and the armature magnets are bowed and have shaped ends for magnetic field concentration purposes. While such magnetic field concentration means result in higher forces imposed upon the armature magnets for given magnet intensities, it is not intended that the inventive concepts be limited to the use of such magnetic field concentrating means.

As will be appreciated from the above description of the invention, the movement of the armature magnet or magnets resultsfrom the described relationship of components. The length of the armature magnets as related to the width of the stator magnets and spacing therebetween, the dimension of the air gap and the configuration of the magnetic field, combined, produce the desired result and motion. The inventive concepts may be practiced even though these relationships may be varied within limits not yet defined and the invention is intended to encompass all dimensional relationships which achieve the desired goal of armature movement. By way of example, with respect to FIGS. 4–7, the following dimensions were used in an operating prototype:

The length of armature magnet 24 is 3⅛", the stator magnets 12 are 1" wide, ¼" thick and 4" long and grain oriented. The air gap between the poles of the armature magnet and the stator magnets is approximately 1½" and the spacing between the stator magnets is approximately ½" inch.

In effect, the stator magnets define a magnetic field track of a single polarity transversely interrupted at spaced locations by the magnetic fields produced by the lines of force existing between the poles of the stator magnets and the unidirectional force exerted on the armature magnet is a result of the repulsion and attraction forces existing as the armature magnet traverses this magnetic field track.

It is to be understood that the inventive concept embraces an arrangement wherein the armature magnet component is stationary and the stator assembly is supported for movement and constitutes the moving component, and other variations of the inventive concept will be apparent to those skilled in the art without departing from the scope thereof. As used herein the term "track" is intended to include both linear and circular arrangements of the static magnets, and the "direction" or "length" of the track is that direction parallel or concentric to the intended direction of armature magnet movement.

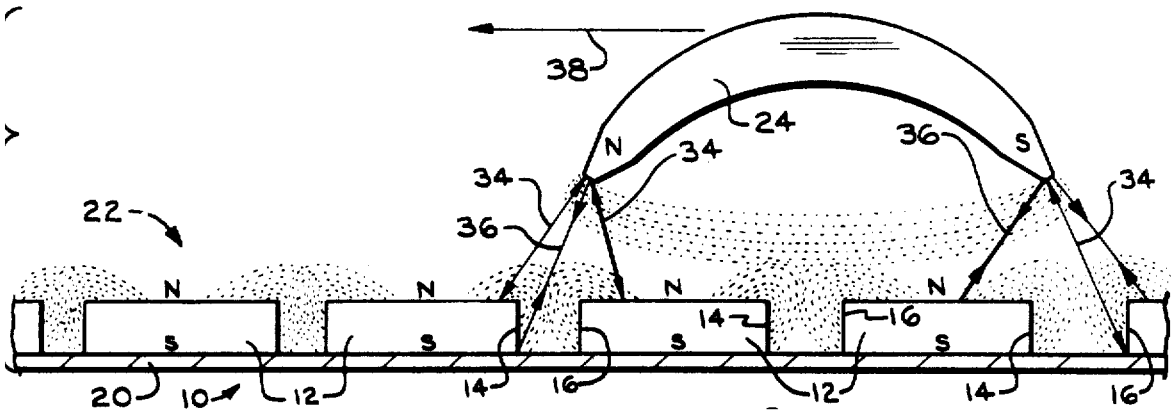

I claim:

1. A permanent magnet motor comprising, in combination, a stator track defining a track direction and having first and second sides and composed of a plurality of track permanent magnets each having first and second poles of opposite polarity, said magnets being disposed in side-by-side relationship having a spacing between adjacent magnets and like poles defining said track sides, an elongated armature permanent magnet located on one of said track sides for relative movement thereto and in spaced relationship to said track side wherein an air gap exists between said armature magnet and said track magnets, said armature magnet having first and second poles of opposite polarity located at the opposite ends of said armature magnet defining the length thereof, the length of said armature magnet being disposed in a direction in general alignment with the direction of said track, the spacing of said armature magnet poles from said track associated side and the length of said armature magnet as related to the width and spacing of said track magnets in the direction of said track being such as to impose a continuous force on said armature magnet in said general direction of said track.

2. In a permanent magnet motor as in claim 1 wherein the spacing between said poles of said armature magnet and the adjacent stator track side are substantially equal.

3. In a permanent magnet motor as in claim 1 wherein the spacing between adjacent track magnets varies.

4. In a permanent magnet motor as in claim 1 wherein a plurality of armature magnets are disposed on a common side of said stator track, said armature magnets being mechanically interconnected.

5. In a permanent magnet motor as in claim 4 wherein said armature magnets are staggered with respect to each other in the direction of said track.

6. In a permanent magnet motor as in claim 1 wherein magnetic field concentrating means are associated with said track magnets.

7. In a permanent magnet motor as in claim 6 wherein said field concentrating means comprises a sheet of magnetic material of high magnetic field permeability engaging side and pole of said track magnets opposite to that side and pole disposed toward said armature magnet.

8. In a permanent magnet motor as in claim 1 wherein said armature magnet is of an arcuate configuration in its longitudinal direction bowed toward said track, said said armature magnet having ends shaped to concentrate the magnetic field at said ends.

9. In a permanent magnet motor as in claim 1 wherein said stator track is of a generally linear configuration, and means supporting said armature magnet relative to said track for generally linear movement of said armature magnet.

10. In a permanent magnet motor as in claim 1 wherein said stator track magnets define a circle having an axis, an armature rotatably mounted with respect to said track and concentric and coaxial thereto, said armature magnet being mounted upon said armature.

11. In a permanent magnet motor as in claim 10, means axially adjusting said armature relative to said track whereby the axial relationship of said armature magnet and said stator magnets may be varied to adjust the rate of rotation of said armature.

12. In a permanent magnet motor as in claim 10 wherein a plurality of armature magnets are mounted on said armature.

13. In a permanent magnet motor as in claim 12 wherein said armature magnets are circumferentially nonuniformly spaced on said armature.

14. A permanent magnet motor comprising, in combination, a stator comprising a plurality of circumferentially spaced stator permanent magnets having poles of opposite polarity, said magnets being arranged to substantially define a circle having an axis, the poles of said magnets facing in a radial direction with respect to said axis and poles of the same polarity facing away from said axis and the poles of opposite polarity facing toward said axis, an armature mounted for rotation about said axis and diposed adjacent said stator, at least one armature permanent magnet having poles of opposite polarity mounted on said armature and in radial spaced relationship to said circle of stator magnets, said armature magnet poles extending in the circumferential direction of armature rotation, the spacing of said armature magnet poles from said stator magnets and the circumferential length of said armature magnet and the spacing of said stator magnets being such as to impose a continuing circumferential force on said armature magnet to rotate said armature.

15. In a permanent magnet motor as in claim 14 wherein a plurality of armature magnets are mounted upon said armature.

16. In a permanent magnet motor as in claim 14 wherein said armature magnets are asymmetrically circumferentially spaced on said armature.

17. In a permanent magnet motor as in claim 14 wherein the poles of said armature magnet are shaped to concentrate the magnetic field thereof.

18. In a permanent magnet motor as in claim 14, magnetic field concentrating means associated with said stator magnets concentrating the magnetic fields thereof at the spacings between adjacent stator magnets.

19. In a permanent magnet motor as in claim 18 wherein said magnet field concentrating means comprises an annular ring of high magnetic field permeability material concentric with said axis and in substantial engagement with poles of like polarity of said stator magnets.

20. In a permanent magnet motor as in claim 14 wherein said armature magnet is of an arcuate bowed configuration in the direction of said poles thereof defining a concave side and a convex side, said concave side being disposed toward said axis, and said poles of said armature magnet being shaped to concentrate the magnetic field between said poles thereof.

21. In a permanent magnet motor as in claim 14, means for axially displacing said stator and armature relative to each other to adjust the axial alignment of said stator and armature magnets.

22. The method of producing a unidirectional motive force by permanent magnets using a plurality of spaced stator permanent magnets having opposite polarity poles defining a track having a predetermined direction, and an armature magnet having a length defined by poles of opposite polarity movably mounted for movement relative to the track in the direction thereof, and of a predetermined length determined by the width and dimensions of said stator magnets comprising forming a magnetic field track by said stator magnets having a magnetic field of common polarity interrupted at spaced locations in a direction transverse to the direction of said magnetic field track by magnetic fields created by magnetic lines of force existing between the poles of the stator magnets and positioning the armature magnet in spaced relation to said magnetic field track longitudinally related to the direction of the magnetic field track such a distance that the repulsion and attraction forces imposed on the armature magnet by said magnetic field track imposes a continuing unidirectional force on the armature magnet in the direction of the magnetic field track.

23. The method of producing a unidirectional motive force as in claim 22 including concentrating the magnetic fields created by magnetic lines of force between the poles of the stator magnets.

24. The method of producing a unidirectional motive force as in claim 22 including concentrating the magnetic field existing between the poles of the armature magnet.

25. The method of producing a unidirectional motive force as in claim 22 including concentrating the magnetic fields created by magnetic lines of force between the poles of the stator magnets and concentrating the magnetic field existing between the poles of the armature magnet.

26. The method of producing a motive force by permanent magnets wherein the unpaired electron spinning particles existing within a permanent magnet are utilized for producing a motive force comprising forming a stator magnetic field track by means of at least one permanent magnet, producing an armature magnetic field by means of a permament magnet and shaping and locating said magnetic fields in such a manner as to produce relative continuous unidirectional motion between said stator and armature field producing magnets.

27. The method of producing a motive force by permanent magnets as in claim 26 wherein said stator magnetic field is substantially of a single polarity.

28. The method of producing a motive force by permanent magnets as in claim 26 including concentrating the magnetic field of said stator field track and armature magnetic field.

* * * * *

UNITED STATES PATENT AND TRADEMARK OFFICE
CERTIFICATE OF CORRECTION

PATENT NO. : 4,151,431

DATED : April 24, 1979

INVENTOR(S) : Howard R. Johnson

It is certified that error appears in the above—identified patent and that said Letters Patent is hereby corrected as shown below:

The title page should be deleted to insert the attached title page therefor.

Column 12, claims 26, 27 and 28 should be deleted inclusively.

Signed and Sealed this

Twenty-sixth Day of August 1980

[SEAL]

Attest:

SIDNEY A. DIAMOND

Attesting Officer     Commissioner of Patents and Trademarks

United States Patent [19]

Johnson

[11] 4,151,431
[45] Apr. 24, 1979

[54] PERMANENT MAGNET MOTOR

[76] Inventor: Howard R. Johnson, 3300 Mt. Hope Rd., Grass Lake, Mich. 49240

[21] Appl. No.: 422,306

[22] Filed: Dec. 6, 1973

[51] Int. Cl.² .................. H02K 41/00; H02N 11/00
[52] U.S. Cl. ................................. 310/12; 310/152
[58] Field of Search .......... 24/DIG. 9; 415/DIG. 2; 46/236; 273/118 A, 119 A, 120 A, 121 A, 122 A, 123 A, 124, 125 A, 126 A, 130 A, 131 A, 131 AD, 134 A, 135 A, 136 B, 137 AE, 138 A

[56] References Cited
U.S. PATENT DOCUMENTS 4,074,153  2/1978  Baker et al. ...................... 310/12

Primary Examiner—Donovan F. Duggan
Attorney, Agent, or Firm—Beaman & Beaman

[57] ABSTRACT

The invention is directed to the method of utilizing the unpaired electron spins in ferro magnetic and other materials as a source of magnetic fields for producing power without any electron flow as occurs in normal conductors, and to permanent magnet motors for utilizing this method to produce a power source. In the practice of the invention the unpaired electron spins occurring within permanent magnets are utilized to produce a motive power source solely through the superconducting characteristics of a permanent magnet and the magnetic flux created by the magnets are controlled and concentrated to orient the magnetic forces generated in such a manner to do useful continuous work, such as the displacement of a rotor with respect to a stator. The timing and orientation of magnetic forces at the rotor and stator components produced by permanent magnets to produce a motor is accomplished with the proper geometrical relationship of these components.

25 Claims, 10 Drawing Figures